United States Patent Office 3,652,545
Patented Mar. 28, 1972

3,652,545
PROCESS FOR PREPARING N-(6-AMINOHEXYL) HEXAMETHYLENEIMINE
Theodore Horlenko and Hopkins W. Tatum, Corpus Christi, Tex., assignors to Celanese Corporation, New York, N.Y.
No Drawing. Continuation-in-part of application Ser. No. 509,242, Oct. 14, 1965, now Patent No. 3,524,892, which is a division of application Ser. No. 238,293, Nov. 16, 1962, now Patent No. 3,268,588, which in turn is a continuation-in-part of application Ser. No. 860,349, Dec. 18, 1959. This application Nov. 28, 1969, Ser. No. 880,979
Int. Cl. C07d 41/04
U.S. Cl. 260—239 B
4 Claims

ABSTRACT OF THE DISCLOSURE

N-(6-aminohexyl) hexamethyleneimine, a new composition of matter useful as a corrosion inhibitor and as a component of lubricants for pumps and compressors handling process streams in the ammonolysis of 1,6-hexanediol to produce hexamethylenediamine and related compounds, is produced by reacting hexamethylenediamine, hexamethyleneimine, or a mixture of these compounds in the presence of ammonia and a catalyst selected from the group consisting of Raney nickel, Raney cobalt, and Raney nickel or kieselguhr. In a specific embodiment the compound is produced by the catalytic ammonolysis of 1,6-hexanediol to form a mixture of products which then react further to form the N-(6-aminohexyl) hexamethyleneimine. Hexamethylenediamine can be withdrawn from the reaction product for use as such; at least a portion of the hexamethyleneimine contained in the product is preferably recycled to the reaction zone for further conversion to N-(6-aminohexyl) hexamethyleneimine.

BACKGROUND OF THE INVENTION

This application is a continuation-in-part of Ser. No. 509,242, filed Oct. 14, 1965, and now issued as U.S. Pat. 3,524,892 which is a division of Ser. No. 238,293, filed Nov. 16, 1962 and now issued as U.S. Pat. 3,268,588, which in turn is a continuation-in-part of Ser. No. 860,349, filed Dec. 18, 1959 and now abandoned.

This invention relates to amine derivatives of 1,6-hexanediol. More particularly it relates to compounds obtained by subjecting 1,6-hexanediol to ammonolysis in the presence of a suitable catalyst and to amines obtained by subjecting the first-stage ammononolysis derivatives of 1,6-hexanediol to further, bimolecular condensation, reactions.

More specifically this invention relates to a new composition of matter, N-(6-aminohexyl) hexamethyleneimine, and a practical method for manufacturing it from 1,6-hexanediol.

N-(6-aminohexyl) hexamethyleneimine is useful as a corrosion inhibitor. In addition it has high lubricity and is useful as a lubricant for, for example, pumps and compressors handling process streams in a process for converting 1,6-hexanediol to hexamethylenediamine by catalytic ammonolysis as described in U.S. Pat. No. 3,268,588. When used as a lubricant in this manner, preferably admixed with 1,6-hexanediol in a composition comprising approximately 80 weight percent N-(6-aminohexyl) hexamethyleneimine and 20 weight percent 1,6-hexanediol, the compound has an advantage over ordinary lubricants, e.g. hydrocarbon lubricants, in that product contamination, and fouling of the ammonolysis catalyst, by foreign materials is avoided.

BRIEF SUMMARY OF THE INVENTION

N-(6-aminohexyl) hexamethyleneimine is a viscous liquid having a boiling point of 103° C. at 1.5 mm. HgA and 200° C. at 100 mm. HgA. Its hydrobromide salt, formed by dissolving the N-(6-aminohexyl) hexamethyleneimine in anhydrous ether and bubbling HBr gas through the solution until precipitation of the salt is complete, has been found to have a melting point of 103° C. to 115° C., a sharp melting point not being obtained because the compound can react with either one or two equivalents of acid.

As will be explained more fully below, N-(6-aminohexyl) hexamethyleneimine is formed, along with hexamethylenediamine, hexamethyleneimine, 6-aminohexanol, and a polymeric amine fraction, when 1,6-hexanediol is subjected to catalytic ammonolysis. Ordinarily this operation is carried out for the purpose of producing hexamethylenediamine, the other compounds just named being recycled to the ammonolysis reaction step for conversion to additional quantities of hexamethylenediamine as described in U.S. 3,268,588. However, the N-(6-aminohexyl) hexamethyleneimine can be removed from the recycle stream, by vacuum distillation, to whatever extent is desired, its loss from the ammonolysis reaction system being made up by increasing the amount of 1,6-hexanediol feedstock. It is also possible, if desired, to react hexamethylene diamine, hexamethyleneimine, 6-aminohexanol, or the polymeric amines, either individually or in any desired mixture, in the presence of ammonia and the same ammonolysis catalysts employed for converting 1,6-hexanediol to hexamethylenediamine, to produce N-(6-aminohexyl) hexamethyleneimine, although production from 1,6-hexanediol as a co-product with hexamethylenediamine is the method which is ordinarily most useful commercially. The ammonolysis reaction is characterized by an equilibrium among the several products just named, and it can be controlled to produce any of the group consisting of N-(6-aminohexyl) hexamethyleneimine, 6-aminohexanol, hexamethyleneimine, hexamethylenediamine, or the polymeric amines as the major product by simply withdrawing the desired compound or compounds from the reaction product and recycling the other members of the group to the ammonolysis reactor along with makeup 1,6-hexanediol.

DETAILED DESCRIPTION OF THE INVENTION

The ammonolysis, or amination, of 1,6-hexanediol produces a mixture of products including hexamethylenediamine, hexamethyleneimine, N-(6-aminohexyl) hexamethyleneimine, 6-aminohexanol-1, N-(6-hydroxyhexyl) hexamethyleneimine, N-hexyl hexamethyleneimine, N-pentyl hexamethyleneimine, and a polyamine having the formula

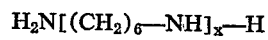

$$H_2N[(CH_2)_6—NH]_x—H$$

where $x$ is 2 to 100. The reaction can be controlled to maximize the production of any of these materials by recovering the desired compound, e.g. hexamethylenediamine or N-(6-aminohexyl) hexamethyleneimine, from the crude ammonolysis reaction product, typically by vacuum distillation, and recycling the unwanted compounds to the ammonolysis reaction step wherein they are converted to produce additional quantities of the desired compound. For example, U.S. 3,268,588 describes the production of hexamethylenediamine by removing it from the reaction product while recycling the other components to the ammonolysis reactor. (It will be recognized that compounds containing only 5 carbon atoms or less cannot be converted to 6 carbon atom compounds.) Just as the production of hexamethylenediamine can be maximized at the expense of production of the other products named above, it is also possible to produce N-(6-aminohexyl) hexamethyleneimine, which constitutes about 15% of the crude ammonolysis reaction product by recovering it from the reaction product and recycling some or all of the other components. Specifically, it is recommended that to maximize the production of N-(6-aminohexyl) hexamethyleneimine, at least a portion of the hexamethyleneimine contained in the reaction product should be recycled to the ammonolysis reactor; even more preferably at least a portion, and preferably all, of the polymeric amine should be recycled to the reactor. Part or all of the hexamethylenediamine is recycled to the reactor depending upon whether it is desired to produce hexamethylenediamine as a co-product.

The ammonolysis of 1,6-hexanediol is accomplished by mixing the diol with ammonia and passing it, in the liquid phase, over an ammonolysis catalyst at about 1500 to 4000 p.s.i.g. and at a temperature of approximately 150 to 250° C., preferably 2800 to 3300 p.s.i.g. and 180 to 220° C. The ammonolysis product is separated by distillation, as will be described below, into lighter fractions including hexamethyleneimine and hexamethylenediamine (at least a portion of the hexamethylenediamine being then recovered in pure form if desired), an intermediate fraction constituting the N-(6-aminohexyl) hexamethyleneimine, and a residue comprising predominantly polymeric amines. All fractions which it is not desired to recover as end products are recycled to the ammonolysis reactor, it being recognized, of course, that compounds containing less than 6 carbon atoms are not precursors of N-(6-aminohexyl) hexamethyleneimine and should be removed from the recycle stream, either intermittently or continuously, in order to avoid an undesired buildup of these by-products in the reaction product.

The ammonolysis of 1,6-hexanediol can be carried out with ammonia alone, but preferably with ammonia mixed with hydrogen. As explained above it is preferred to add, as a recycle stream, substantially all the 6 carbon precursors of N - (6 - aminohexyl) hexamethyleneimine which are formed in the ammonolysis reaction and later separated from the ammonolysis product. It is of course within the scope of the invention to either recycle these compounds, recover them for sale, or otherwise dispose of them.

Suitable ammonolysis catalysts are Raney nickel, Raney cobalt, reduced copper, Raney copper, and nickel on kieselguhr. Pelletized or chunk Ranel nickel is preferred. The reaction between the ammonia, diol, and any recycled diamine precursors takes place over the catalyst bed. It is further preferred to include hydrogen with the ammonia in the ammonolysis reactor. Mole ratios of ammonia to hydrogen in the range of about 4:1 to 30:1 have been found to be operable, with about 6:1 to 10:1 being preferred. The optimum ratio of ammonia to hydrogen for conversion of 1,6-hexanediol to amines such as hexamethylenediamine and N-(6-aminohexyl) hexamethyleneimine at 3300 p.s.i.g. and 225° C. is about 8:1. The ratio of ammonia molecules to carbon atoms in the ammonolysis reaction is preferably about 1/3:1 to 5:1.

The ammonolysis reaction can be carried out in either a fixed catalyst bed or a slurry catalyst system. A fixed bed catalyst can be in the form of a trickle bed or a flooded bed, preferably the latter.

The ammonolysis reaction product is suitably reduced in pressure to about atmospheric to 150 p.s.i.g., preferably about 133 p.s.i.g., to remove most of the entrained or dissolved ammonia and hydrogen, which is recycled to the ammonolysis reaction step. The remaining liquid is then distilled at about 100 p.s.i.g. to remove the remaining ammonia, after which the substantially ammonia-free product (it may contain up to about 8% ammonia) is dried by being azeotroped, suitably with cyclohexane at about atmospheric pressure. The dried product is then distilled to remove hexamethyleneimine overhead, which is either recycled to the ammonolysis reactor or taken as a product. The resulting residue is then redistilled to recover hexamethylenediamine overhead, preferably under vacuum (e.g. about 100 mm. Hg A). If it is not desired to recover any of the hexamethylenediamine but rather to recycle it all to the ammonolysis reactor in order to maximize yield of N-(6-aminohexyl) hexamethyleneimine, the hexamethylenediamine and hexamethyleneimine can be distilled together, under vacuum, as a mixed distillate cut.

From the residue remaining after removal of the hexamethylenediamine and hexamethyleneimine, the N-(6-aminohexyl) hexamethyleneimine is then removed as a vacuum distillate, boiling at about 130° C. at about 5 mm. Hg A. The residue, comprising predominantly polymeric amines, is suitably recycled to the ammonolysis reactor. When the N-(6-aminohexyl hexamethyleneimine is distilled out of the residue remaining after recovery of the hexamethylenediamine and hexamethyleneimine, a substantial quantity of 1,6-hexanediol, which is slightly less volatile than the N-(6-aminohexyl) hexamethyleneimine, remains in the still pot and serves as an entrainer if it is desired to distill out the entirety of the N-(6-aminohexyl) hexamethyleneimine rather than allowing a portion thereof to remain in the residue. When the N-(6-aminohexyl) hexamethyleneimine is to be employed as a lubricant, it is not harmful and is in fact preferred to allow some 1,6-hexanediol to be distilled over with it, a mixture comprising approximately 20% to 25% 1,6-hexanediol having been found to be a desirable lubricating composition.

When the ammonolysis reaction and product recovery system described above is employed to produce hexamethylenediamine as the major product, which is a desirable embodiment of the invention, the system is about 90 to 95% efficient in converting the 1,6-hexanediol to hexamethylenediamine and N-(6-aminohexyl) hexamethyleneimine. About 10 to 15 weight percent of the hexanediol is converted to the desired amine products per pass. Under steady state equilibrium conditions, using as catalyst a fixed bed of Raney nickel pellets and with hexamethylenediamine being the major product recovered, the recycle composition in the ammonolysis operation is about 10% to 23% 1,6-hexanediol (12% to 15% hexamethyleneimine, 10% to 15% 1-amino-6-hexanol, 15% to 35% N-(6-aminohexyl) hexamethyleneimine, 0.3% hexamethylenediamine, and 18% to 50% of other products, largely polymer amines. It will be recognized that, when it is desired to direct the reaction to the production of N-(6-aminohexyl) hexamethyleneimine as the major product, with hexamethylenediamine being recycled to the reactor rather than being recovered as a product, the recycle will contain more hexamethylenediamine and less of the N-(6-aminohexyl) hexamethyleneimine. Lower molecular weight amines are also formed in the ammonolysis reaction; some amyl amine is formed and comes off with the cyclohexane fraction mentioned above, and dimethylamine is found in the ammonolysis reactor vent gas.

Another aspect of this invention is the discovery that Raney nickel pellets or chunks catalytically promote the reaction of hexamethylenediamine to form hexamethyleneimine. The yield in this reaction is about 50%.

The following example is given to illustrate the practice of this invention in producing hexamethylenediamine as the major product while recovering N-(6-aminohexyl) hexamethyleneimine as a co-product.

EXAMPLE I

An ammonolysis feedstock consisting of 384 parts of 1,6-hexanediol was mixed with 105 parts of ammonia and 1 part of hydrogen together with a recycle stream containing 97 parts of hydrogen, 354 parts of 1,6-hexanediol, 4786 parts of ammonia, 303 parts of hexamethyleneimine, 286 parts of 6-aminohexanol, 774 parts of polymeric amines, and 774 parts of a material which had been detected in the recycle stream and which was characterized by a sharply defined peak at mass equivalent 112 during mass spectrometric analysis. The reactor was maintained at 210° C. and 3300 p.s.i.g.; reactor residence time was 1 hour. The reactor product was flashed to remove hydrogen and ammonia overhead, after which the flasher residue was stripped to remove additional ammonia overhead for recycle to the ammonolysis reactor. The stripped flasher residue was then mixed with cyclohexane and fed to a drying column in which water contained in the fraction was taken off as the cyclohexane azeotrope. The azeotrope was decanted to remove the water, and the cyclohexane was recycled to the drying column feed.

The drying column residue was fed to an imine column in which hexamethyleneimine was taken overhead. The imine column residue was then fed to a hexamethylenediamine column in which 336 parts of hexamethylenediamine was recovered as a sidestream. The residue from the hexamethylenediamine column, containing 1,6-hexanediol, 6-aminohexanol, polymeric amines, and the material identified above as having a pronounced peak at mass equivalent 112 was then resdistilled in a 40-tray batch still at 100 millimeters HgA head pressure, and a fraction condensing between 190° C. and 220° C. was collected. The cut just described was examined by gas chromatography, and was found to consist predominantly of a compound characterized by a sharp gas chromatographic peak between the peaks characteristic of 6-aminohexanol and 1,6-hexanediol. A purified sample of this material was collected chromatographically. It was found to be a viscous liquid with an infrared spectrum similar but not identical to that of synthetic 6-hydroxyhexyl hexamethyleneimine, and its mass spectrum had strong peaks at mass equivalent 112 and mass equivalent 198. It was tentatively assigned the structure of N-(6-aminohexyl) hexamethyleneimine. It was then analyzed by combustion, and was found to contain 72.89 weight percent carbon, 13.32 percent hydrogen, and 13.79 percent nitrogen, which values are in agreement with the structure of aminohexyl hexamethyleneimine.

In order to prove the identity of the tentatively identified compound, synthetic N-(6-aminohexyl) hexamethyleneimine was prepared by reducing, with lithium aluminum hydride, a quantity of what was known to be N-(5-cyanopentyl) hexamethyleneimine to form synthetic N-(6-aminohexyl) hexamethyleneimine. The synthetic product, which had been formed by reduction in dry ethyl ether, was purified by distilling off the ether and vacuum-distilling the resulting residue to produce a liquid which had a boiling point between 102° C. and 104° C. at 1.5 mm. HgA and 200° C. at 100 mm. HgA and a refractive index at 25° C. of 1.4787. By gas chromatography it was determined that the material was 98% pure. This material was then repurified by gas chromatographic trapping, and the resulting purified material was compared with the purified material which had been recovered from the ammonolysis reaction product by chromatographic trapping as explained above. The two samples had identical infrared, mass spectrometric, and nuclear magnetic resonance spectra, as well as the same gas chromatographic retention time.

It will be recognized that the foregoing detailed description is given merely by way of illustration, that many variations may be made therein within the scope of our invention.

The embodiments of the invention in which an exclusive property or privilege is claimed are defined as follows:

1. A process for producing N-(6-aminohexyl) hexamethyleneimine which comprises continuously introducing 1,6-hexanediol, ammonia, and hydrogen into a reaction zone containing a catalyst selected from the group consisting of Raney nickel, Raney cobalt, and nickel on kieselguhr in the following ratios: mole ratio of ammonia to hydrogen of about 4:1 to 30:1 and ratio of ammonia molecules to carbon atoms of about 1/3:1 to 5:1; maintaining said reaction zone at about 180 to 220° C. at about 1500 to 4000 p.s.i.g.; producing by reaction of the contents of said reaction zone under the conditions expressed above a reaction product comprising hexamethylenediamine, 6-aminohexanol, hexamethyleneimine, N-(6-aminohexyl) hexamethyleneimine, and a polymeric amine of the formula $$H_2N[(CH_2)_6]_x-H$$

where $x$ is 2 to 100; recovering N-(6-aminohexyl) hexamethyleneimine from said reaction product; and recycling to said reaction zone at least a portion of the hexamethyleneimine contained in said reaction product.

2. The process of claim 1 further characterized in that the N-(6-aminohexyl) hexamethyleneimine is recovered from the reaction product by vacuum distillation.

3. The process of claim 2 wherein the catalyst is Raney nickel.

4. The process of claim 3 comprising the additional step of recycling to the reaction step at least a portion of the polymeric amine contained in the reaction product.

References Cited
UNITED STATES PATENTS 3,268,588    8/1966    Horlenko et al. _____ 260—239

FOREIGN PATENTS 892,034    3/1944    France _____ 260—239

ALTON D. ROLLINS, Primary Examiner